United States Patent [19]

Chen et al.

[11] Patent Number: 5,451,653
[45] Date of Patent: Sep. 19, 1995

[54] CURABLE CROSSLINKING SYSTEM WITH MONOBENZALDIMINE AS CROSSLINKER

[75] Inventors: Ning Chen, Allentown; Chao-Fong Tien; Thomas M. Santosusso, both of Macungie; Larry A. Wasowski, Emmaus; Robert K. Pinschmidt, Jr., Allentown, all of Pa.

[73] Assignee: Air Products and Chemicals, Inc., Allentown, Pa.

[21] Appl. No.: 365,723

[22] Filed: Dec. 28, 1994

[51] Int. Cl.[6] .................................................. C08F 8/30
[52] U.S. Cl. .................................... 525/374; 524/555; 525/328.2; 525/328.6; 525/375
[58] Field of Search ................. 525/374, 375; 524/555

[56] References Cited

U.S. PATENT DOCUMENTS

| | | | |
|---|---|---|---|
| 3,668,183 | 6/1972 | Hoy et al. | 260/65 |
| 4,743,668 | 6/1988 | Fong et al. | 526/204 |
| 4,908,403 | 3/1990 | Spada et al. | 524/818 |
| 5,288,804 | 2/1994 | Kim et al. | 525/154 |

OTHER PUBLICATIONS

Kim, et al. "Utilization of the Novel Acetoacetate Chemistry and Solvent and Water Borne Coatings" Presented at the Water Borne, Higher–Solids and Powder Coating Symposium Feb. 24–26, 1993.

*Primary Examiner*—Bernard Lipman
*Attorney, Agent, or Firm*—Russell L. Brewer; William F. Marsh

[57] ABSTRACT

This invention relates to improved crosslinking systems for polymeric dispersions and solutions having suitability for coatings, adhesives and use in many other applications. These systems are based upon crosslinkable polymers having a plurality of activated keto methylene groups, e.g., a beta diketone such as an acetoacetate or a keto cyano methylene functional groups and a crosslinkable component comprising an aldimine. A sufficient amount of the aldimine curing agent is used to effect reaction with the polymer containing the activated keto methylene groups and cure thereof. The improvement in the crosslinking system resides in the utilization of a monoaldimine having only one aldimine group and no other methylene reactive group as a crosslinking agent. Another improvement variation to that previously suggested comprises a redispersible polymer(s) containing activated methylene functionality and combined with the monoaldimine and the use of heterocyclic aldimine.

22 Claims, No Drawings

CURABLE CROSSLINKING SYSTEM WITH MONOBENZALDIMINE AS CROSSLINKER

TECHNICAL FIELD OF THE INVENTION

The present invention relates to a new crosslinking reaction system for polymer systems containing activated methylene functionality, e.g., acetoacetate groups. The crosslinker is a monoaldimine.

BACKGROUND OF THE INVENTION

Solvent and water-based crosslinkable polymers have wide utility in industry as coatings and adhesives. Current and proposed environmental regulations have been instrumental in the development of formaldehyde- and isocyanate-free coatings in an effort to reduce health hazard materials used in coatings. One relatively new type of water-borne system is based upon a polymeric system having a plurality of acetoacetate groups and a crosslinker system of blocked polyamines which is capable of reacting with the acetoacetate groups. Recently developed blocked polyamine crosslinkers for acetoacetate coatings are based upon benzaldimine chemistry. Publications describing acetoacetate chemistry as well as that associated with benzaldimine crosslinking systems are as follows:

European Patent EP 0 552 469 discloses polyacetoacetate resins curable with a crosslinker comprising a multifunctional benzaldimine. In the background of EP '469, the patentees point out that U.S. Pat. No. 3,668,183 discloses the use of a blocked aldimine or ketimine generated by the reaction of polyamine and an aliphatic ketone or aliphatic aldehyde as a curative for polyacetoacetate resins to form polyenamine resins. The patentees of '469 point out the aliphatic aldimine crosslinking system is moisture intolerant and that gloss and solvent resistance are not as high as desired. European '469 suggests the formation of a two component coating composition comprising a polymer containing a plurality of acetoacetate functional groups as a first component and a second component consisting of an aromatic aldimine having the structure:

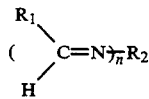

where $R_1$ is an aryl group, $R_2$ is a hydrocarbon, a polyalkylether, an oligomeric adduct or an acrylic polymer which may contain at least one group, such as a secondary amine which will react with the acetoacetate groups, and n is greater than 2 unless another acetoacetate reactive group is present. Both solvent and waterborne coatings are prepared.

An article by Kim, et al., *Utilization of the Novel Acetoacetate Chemistry and Solvent and Water Borne Coatings*, presented at the Water Borne, Higher-Solids and Powder Coating Symposium, Feb. 24–26, 1993, supplements European '469 EPO. Two component coating systems based upon acetoacetate functional polymers employing an aromatic aldimine as the crosslinker are described. Again, at least two aldimine groups or an aldimine and at least one other acetoacetate reactive group are present in the crosslinker.

U.S. Pat. No. 5,288,804 is the U.S. companion to European '469 and to the article by Kim, et al.. It too, pertains to curable polyacetoacetate resins having low solvent loading using a multifunctional benzaldimine as the curing agent.

U.S. Pat. No. 4,743,668 discloses vinyl polymers containing polymerized N-acetoacetylacrylamide units which are found useful for effecting coagulation, flocculation and dewatering of wet slurries. One of the monomer structures is represented by the formula:

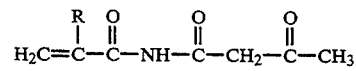

wherein R is H or $CH_3$. This monomer then is polymerized with a variety of other ethylenically unsaturated monomers, e.g., vinyl acetate, acrylic acid, acrylamide, vinylethers, maleic anhydride and so forth. Other monomers include acrylonitrile, various acrylic and methacrylic acid esters and the like. These polymers then are contacted with a bisulfite salt to form a sulfonate substituted material.

U.S. Pat. No. 4,908,403 discloses the production of pressure sensitive adhesives from acetoacetoxy-alkylacrylate polymers by emulsion polymerization. The monomers are generally defined by the formula:

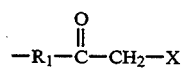

wherein $R_1$ is a divalent organic radical and X is an organoacyl or cyano group. The monomer is polymerized with other ethylenically unsaturated monomers, e.g., vinyl esters of carboxylic acids which include vinyl acetate and vinyl propionate; alpha-beta-unsaturated hydrocarbons, such as ethylene and propylene, and other monomers, e.g., vinyl chloride and alkyl esters of acrylic and methacrylic acid, as well as acrylic and methacrylic acid. The resultant polymers have acceptable adhesive strength without crosslinkers such as N-methylolamides.

In one effort (U.S. Pat. No. 5,214,086), a crosslinking system containing a hydroxyl functional resin, at least one isocyanate functional resin and a di- or multi-aldimine or ketimine functional moiety was described. The crosslinking occurred at either ambient temperature or a higher temperature, the aldimine being used to accelerate the cure rate of the hydroxyl-containing polymer with the polyisocyanate.

U.S. Pat. No. 5,332,785 discloses liquid coating compositions comprising acetoacetate modified epoxy resins and blocked polyamines, e.g., aldimines. Hydroxyl-containing polyepoxides are converted to acetoacetate-modified resins through transesterification using alkylesters of acetoacetic acid.

SUMMARY OF THE INVENTION

This invention relates to improved crosslinking systems for polymeric dispersions having suitability for coatings, adhesives and use in many other applications. These dispersions are based upon crosslinkable polymers having a plurality of activated keto methylene groups, e.g., a beta diketone such as an acetoacetate or keto cyano methylene functional groups, and a crosslinkable component comprising an aldimine. In effecting crosslinking, a sufficient amount of the aldimine curing agent is used to effect reaction with the polymer containing the activated keto methylene groups and cure thereof. The improvement in the crosslinking system resides in the utilization of a monoaldimine having no other activated methylene reactive group present as a crosslinking agent. Another improvement variation to that previously suggested comprises a redispersible polymer(s) containing activated methylene functionality combined with the monoaldimine.

The polymeric component can be in the form of a solution or as a dispersion in water. Examples of polymeric components include addition polymers formed by the polymerization of ethylenically unsaturated monomers, condensation polymers such as polyurethane, epoxy and polyester resins and combinations of condensation and addition polymers, e.g., polyurethane/acrylate hybrids. The crosslinker utilized is one having only one aldimine group and no other activated keto methylene reactive group.

There are several advantages associated with these crosslinkable dispersions and these include:

an ability to produce a low volatile organic content, formaldehyde- and isocyanate-free, crosslinkable polymeric dispersion and have excellent physical properties, e.g., solvent and water resistance;

an ability to form clear solvent and water-borne dispersions which are curable at ambient and elevated temperatures;

an ability to form solvent and water based premium hybrid urethane/acrylic coatings which are crosslinkable;

an ability to produce a crosslinkable polymeric dispersion which has sufficient potlife and low viscosity to permit ease of processing;

an ability to produce crosslinked polymers at reduced aldimine crosslinker levels; and, an ability to use monoaldimines of greater availability as compared to their multifunctional analogs.

DETAILED DESCRIPTION OF THE INVENTION

One of the components making up the polymeric dispersions or solutions having application in coatings, etc., is a solvent or water based dispersion comprising a polymeric component having pendant activated keto methylene functionality, preferably acetoacetate functionality. By activated it is meant that the proton(s) on the methylene group adjacent the carbonyl group is sufficiently reactive with the monoaldimine component to effect reaction and crosslinking.

Two types of techniques have been generally utilized in preparing polymeric components having activated keto methylene functionality, particularly acetoacetate functionality. One technique involves the addition polymerization of a monomer having an activated keto methylene group, e.g., a monomer containing at least one acetoacetate group via solution, emulsion or suspension polymerization. (For purposes herein suspension polymerization is equivalent to and incorporated by reference within the term emulsion polymerization.) Another technique for preparing the polymeric component involves the solution or emulsion polymerization of monomers capable of forming polymers having pendant functional groups convertible to activated keto methylene groups. The use of hydroxyl functional monomers, e.g., hydroxy acrylates, is one way of forming these polymers. These hydroxyl groups then can be converted to activated keto methylene groups via transesterification. Transesterification can be effected by reacting an alkyl acetoacetate, e.g., t-butyl acetoacetate with the hydroxy functional polymer. Other monomers having functional groups convertible to hydroxyl groups, for example, allyl chloride can also be used as a monomer for forming the acetoacetate containing polymer.

Broadly, the polymeric components useful herein are represented by the formulas:

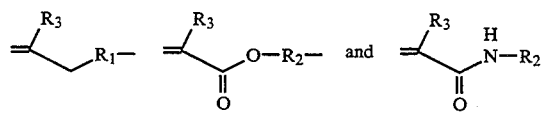

wherein R is hydrogen or methyl, preferably hydrogen and $R_1$ is $C_{1-4}$ alkyl.

Generally, the polymeric component described above containing the activated keto methylene group have polymerized unsaturation units as follows:

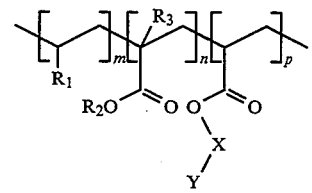

wherein $R_1$ is $C_{1-20}$ alkyl, $C_{1-20}$ alkoxy, and hydroxyalkyl where the alkyl group has from 1–20 carbon atoms; $R_2$ is $C_{1-20}$ alkyl, $C_{1-20}$ alkoxy, and hydroxyalkyl where the alkyl group has from 1–20 carbon atoms; and $R_3$ is hydrogen or methyl. Preferably, the polymer is an acrylate-containing polymer having the general structure:

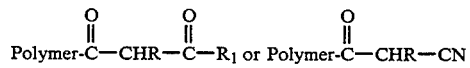

where $R_1$ is pendent from an ethylenically unsaturated monomer capable of copolymerization with another monomer such as $C_{1-8}$alkyl esters of acrylic and methacrylic acid, styrene, vinyl chloride, vinyl acetate, ethylene, maleic and fumaric anhydride, butadiene, acrylonitrile, etc.; $R_2$ is hydrogen, $C_1$–$C_{20}$ alkyl, preferably $C_{1-8}$ alkyl, $C_{2-8}$ alkylene oxide, aryl; $R_3$ is hydrogen or methyl, $X=C_1$–$C_{20}$ alkylene, preferably $C_{1-4}$ alkyl, $C_{2-4}$ alkylene oxide, arylene, secondary or tertiary alkylene amine; and Y is a unit having the structure:

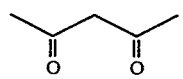

m is 0–100, n is 1–100, p is 1–50. Preferably the alkyl functionality $R_2$ has from 1–8 carbon atoms, X is $C_{1-6}$alkyleneoxy, m is 0–30, n is 40–50 and p is 5–40.

Examples of preferred ethylenically unsaturated monomers are those having acetoacetate functionality. Specific examples include acetoacetoxyethyl methacrylate and N-acetoacetylacrylamide.

The active keto methylene, e.g., acetoacetate-functional group generally comprises from about 10 to 80 weight percent of the total polymer. Preferably from about 20–60% of acetoacetate functionality based upon the total weight of the polymer is used. Generally, it takes a moderate amount of cross-linking to produce desired results, e.g., solvent and water resistance with modest flexibility. High levels of activated keto methylene functionality may reduce stability and one should consider the polymer system and degree of cross-linking desired. In addition these polymers should have a molecular weight of at least 2,000. Preferably, the molecular weight of the addition polymer will be from about 2,000 to 15,000.

Addition polymers generally are copolymers of the monomers having keto methylene functionality or groups convertible to acetoacetate functionality. The monomers containing activated methylene functionality can be reacted with other ethylenically unsaturated monomers containing reactive functional groups to form copolymers containing appropriate levels of keto methylene functionality. These monomers include epoxy-containing monomers and carboxylic acid-containing monomers. Representative epoxy-containing functional monomers are glycidyl acrylate, glycidyl methacrylate, N-glycidylacrylamide and allylglycidyl ether, while the carboxylic acid containing monomers include acrylic and methacrylic acid, crotonic and itaconic acid and anhydrides such as maleic anhydride, phthalic anhydride, itaconic anhydride, etc.. Carboxylic acid amides include acrylamide and N-methylol acrylamide, etc.

The acetoacetate functional monomers also can be polymerized with a variety of ethylenically unsaturated monomers having limited to no reactive functionality. These monomers include $C_1$–$C_8$ alkyl esters of acrylic and methacrylic acid, vinyl esters such as vinyl acetate and vinyl propionate, vinyl chloride, acrylonitrile, butadiene, styrene, etc. Preferred ethylenically unsaturated monomers copolymerizable with the monomers containing activated keto methylene functionality include alkyl (meth)acrylates and specifically methyl methacrylate, 2-ethylhexyl acrylate and butyl acrylate.

Dispersions of condensation polymers containing acetoacetate functionality also are known and can also be used in forming the first polymeric dispersions. These systems can be derived from polyurethanes, polyepoxides and polyesters having pendent hydroxyl groups. Generally, they will have a molecular weight of from 1,000 to 200,000 and will contain from 25 to 50% acetoacetate by weight of the total polymer. Water dispersible polyurethane condensation polymers can be prepared by reacting polyisocyanates with polyhydric compounds incorporating functionality suited for effecting dispersibility in water or through the use of surfactants. Examples of polyisocyanates include the aromatic, aliphatic, and cycloaliphatic isocyanates, such as toluenediisocyanate, m-phenylenediisocyanate, isophoronediisocyanate, methylene di(phenylisocyanate) and methylene-di(cyclohexylisocyanate). Polyhydric compounds suited for reaction with the polyisocyanates to form the polyurethanes typically include both short-chain or long-chain polyols. Examples of short-chain polyols are the lower aliphatic $C_{1-6}$ aliphatic glycols, such as ethylene glycol, butanediol, hexanediol, glycerine, trimethylolpropane and pentaerythritol. Long-chain polyols can be used for preparing polyurethane prepolymers and these include poly(tetramethylene glycol) and polyethylene and polypropylene oxide adducts of ethylene glycol, propylene glycol, butanediol, etc. Molecular weights of these long chain polyols range typically from about 300 to 3000.

Polyepoxide resin dispersions containing pendant hydroxyl groups also are known and can be formed by the reaction of bridged phenols with epichlorohydrin. Typically, the bridging group is a propylidine or methylene group. Examples of polyepoxides include dispersions of a polyglycidyl or diglycidyl ether of polyhydric phenols such as bisphenol A and bisphenol F. Typically, they are in the form of adducts derived by reacting a polyamine with the epoxy group. Residual hydroxyls can be converted to acetoacetate containing polymers by transesterification of pendant hydroxyl groups with, e.g. t-butyl acetoacetate or diketene. A combination of condensation polymers can be formed into water borne dispersions and appropriate functionality applied thereto. Polyurethane resins can be combined with an epoxy component as for example as described in U.S. Pat. No. 4,772,643 which is incorporated by reference.

A combination of condensation/addition polymerization methods can be used to form the polymeric component having acetoacetate functionality, e.g., a polyurethane/acrylate hybrid, one containing acetoacetate functionality. Because of the importance of polyurethane/acrylate hybrids, particularly in water-borne coating applications, such water based polymers are described further.

Water dispersible polyurethane/acrylate hybrids are the preferred form of crosslinkable polymeric dispersions and this preparation is more fully described. In producing the water dispersible hybrids, the acrylate monomer containing the activated methylene functionality is addition polymerized onto the polyurethane prepolymer backbone. These polyurethanes typically incorporate acid functionality in order to enhance water dispersibility and water resistance. Acid functional compounds which may be used in the preparation of the anionic water-dispersible prepolymers include carboxy group containing diols and triols, for example dihydroxyalkanoic acids of the formula:

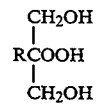

wherein R is hydrogen or a $C_1$–$C_{10}$ alkyl group. The preferred carboxy-containing diol is 2,2-dimethylolpropionic acid. If desired, the carboxy-containing diol or triol may be incorporated into a polyester by reaction with a dicarboxylic acid before being incorporated into the prepolymer. Useful acid group containing compounds include aminocarboxylic acids, for example lysine, cystine and 3,5-diaminobenzoic acid.

The anionic water-dispersible isocyanate-terminated polyurethane prepolymer may be prepared in conventional manner by reacting a stoichiometric excess of the organic polyisocyanate with the polymeric polyol and any other required isocyanate-reactive compounds under substantially anhydrous conditions at a temperature between about 30° C. and 130° C. until the reaction between the isocyanate groups and the hydroxyl groups is substantially complete. A polyisocyanate and the active hydrogen containing components are suitably reacted in such proportions that the ratio of number of isocyanate groups to the number of hydroxyl groups is in the range from about 1.1:1 to about 6:1, preferably within the range of from 1.5:1 to 3:1. If desired, tin catalysts may be used to assist prepolymer formation.

To disperse the prepolymer in water, a tertiary amine is added to the mixture in an amount sufficient to quaternize the carboxylic acid groups therein and to render the prepolymer water dispersible. Typically this is at a level of 65–100% amine equivalents per carboxyl equivalent. Tertiary amines that may be used in the practice of the invention are relatively volatile so that they evaporate from the coating upon curing. Examples of suitable amines are represented by the formula:

$$R-N(R_1)-R_2$$

where R, $R_1$ and $R_2$ are independently $C_1$–$C_6$, preferably $C_2$–$C_4$ alkyl groups. Illustrative of such tertiary amines are trimethylamine, triethylamine, tri-n-butylamine, tricyclohexylamine, dimethylethylamine, and methyldiethylamine. To enhance the compatibility of the organic and aqueous phases, a small quantity of a polar organic liquid such as N-methylpyrrolidone can be added in amounts ranging from 1 to 12 wt %, preferably 3 to 6 wt %, of the final polymer dispersion. The prepolymer may be dispersed in water using techniques well known in the art. Preferably, the prepolymer is added to the water with agitation, or, alternatively, water may be stirred into the mixture.

To increase the molecular weight of the polyurethane, optionally a chain extender containing active hydrogen atoms is added. The active hydrogen-containing chain extender which is reacted with the prepolymer is suitably a polyol, an amino alcohol, ammonia, a primary or a secondary aliphatic, alicyclic, aromatic, araliphatic or heterocyclic amine, especially a diamine. The amount of chain extender employed should be approximately equivalent to the free isocyanate groups in the prepolymer, the ratio of active hydrogens in the chain extender to isocyanate groups in the prepolymer preferably being in the range from 0.7 to 1.3:1. Of course when water is employed as the chain extender, these ratios will not be applicable since the water, functioning as both a chain extender and dispersing medium, will be present in a gross excess relative to the free isocyanate groups.

Examples of suitable chain extenders include polyethylene polyamines such as ethylenediamine, diethylenetriamine, triethylenetetramine, propylenediamine, isobutylenediamine, hexamethylenediamine, cyclohexylenediamine; polyoxyalkylene polyamines such as polyethyleneoxypolyamine and polypropyleneoxypolyamine, piperazine, 2-methylpiperazine, phenylenediamine, toluenediamine, tris(2-aminoethyl)amine, 2,6-diaminopyridine, 4,4′-methylenebis(2-chloraniline), 3,3′-dichloro-4,4′diphenyldiamine, 4,4′-diaminodiphenyl methane, isophoronediamine, and adducts of diethylenetriamine.

Solution and emulsion polymerization of the activated methylene group containing monomer to form crosslinkable polymeric dispersions and solutions can be effected by conventional procedures using a free radical polymerization catalyst. Examples of free radical generating catalysts include hydrogen peroxide, t-butylhydroperoxide and azobisisobutyronitrile. Conventional surfactants, emulsifiers and protective colloids may be utilized as stabilizer for the emulsion polymerization. By appropriate selection of stabilizer, one can alter the water sensitivity of the resulting polymer. Selection and adjustment of concentration are at the discretion of the formulator. With regard to the preparation of polyurethane/acrylate hybrids having acetoacetate functionality, a monomer containing acetoacetate functionality is polymerized onto the polyacrylic backbone. Polymerization is effected in conventional manner generally using an oil soluble initiator.

Alternatively, another method for forming self-crosslinking polymeric dispersions is through redispersion of polymers containing acetoacetate functionality. These polymers typically are formed through emulsion polymerization followed by spray drying. Reemulsification can be effected by adding the polymer(s) singly or in combination to water and agitating. Optionally, a surfactant, e.g., ethoxylated nonyl phenol or protective colloids such as polyvinyl alcohol and hydroxy ethyl cellulose can be added to the aqueous medium to facilitate redispersion. Examples of redispersible powders are spray dried emulsions of vinyl acetate, vinyl acetate/acrylic; vinyl acetate-ethylene, vinyl acetate-styrene/maleic anhydride polymers, etc. The polyvinyl acetate may be partially hydrolyzed to convert the acetate groups to hydroxyl groups which then can be converted to acetoacetate groups via transesterification.

Polyurethane, polyurethane/polyacrylate, or polyurethane/polyester hybrid solution polymers can be prepared by the following general method. In this method, one needs to functionalize the isocyanate functional urethane oligomer or polymers. This can be accomplished by capping NCO terminated urethanes with acetoacetate functional hydroxyl moieties, such as: monoacetoacetylated ethylene glycol, diacetoacetylated 1,1,1 -tris(hydroxylmethyl)ethane, and triacetoacetylated pentaerythritol. The functionalized hydroxyl moieties are reacted then with an NCO terminated urethane to give acetoacetylated urethanes.

The aldimine crosslinkers used in effecting crosslinking of the polymers containing activated methylene functionality are formed by reacting a multitude of aromatic aldehydes or heterocyclic aldehydes with a monofunctional aliphatic, aromatic or heterocyclic primary amine. These aldehydes may be reacted in conventional manner with the amine functionality to form the aldimine complex. Representative aromatic and heterocyclic aldehydes are represented by the structures:

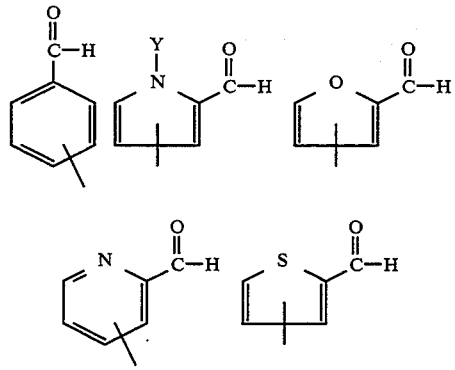

wherein Y represents hydrogen or methyl. Of course, isomers of the above are included within the above structures. Open bonds represent hydrogen or a substituent such as a ($C_{1-6}$) alkyl group, $C_{1-6}$ alkoxy, halogen acetamide sulfonyl, cyano, hydroxyl, trifluoromethyl, amine where the hydrogen atoms have been replaced by organo groups and nitro groups. Such groups are characterized in the fact that they do not interfere with the formation of the aldimine or react with the activated keto methylene group present in the polymer. Specific aldehydes include benzaldehydes and substituted derivatives, e.g., $C_{1-6}$ alkyl and alkoxy substituted derivatives such as methyl and methoxy benzaldehyde, halogenated benzaldehydes, etc. and bridged and fused aromatic aldehydes such as napthaldehyde. Heterocylic aldehydes include furfural, thiophenecarboxaldehyde, pyrrolecarboxyaldehyde, pyridinecarboxaldehyde, etc. For preferred results 3-pyridinecarboxaldimine is one of the preferred aldehydes to be employed for forming the monoaldimine structure.

A wide variety of monoprimary amines may be used in preparing the monoaldimine crosslinking agent. The amines play little role in the crosslinking reaction and are liberated on cure. Primary amines include aliphatic, cycloaliphatic, aromatic, and heterocyclic amines. These amines also include substituted amines so long as they do not have a group reactive with the acetoacetate group. Such amines include alkyl amines hydroxyalkylamines and hydroxyalkyletheramines. Typically, the alkyl portions of such amines will have from 1–8 carbon atoms. Specific examples of suitable amines include methylamine, ethylamine, n and i-propylamine, n, i and t,-butylamine, ethoxyethylamine dimethoxyethylamine, ethoxyethanolamine, hydroxyethylpiperazine, cyclohexylamine, aniline and so forth.

By and large the amines used in preparing the aldimine do not participate materially in the reaction. Thus, the rate and performance of the resulting crosslinked polymer is not affected by the amine. The rate of crosslinking is influenced more by the aldehyde used in forming the aldimine; the extent of cure is controlled by the crosslink density. Surprisingly, the heterocyclic aldimines, for example, are faster reacting than the benzaldehydes.

Broadly, then,, the aldimines suited for practicing the process are represented by the structures:

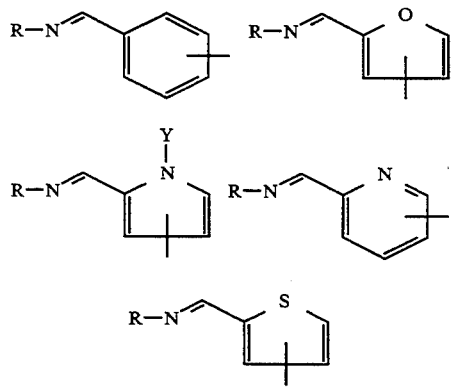

wherein, R is $C_{1-10}$ aliphatic, alkylene oxide ($C_{1-10}$), aryl, or a substituted derivative. Open bonds represent hydrogen or a substituent such as a ($C_{1-6}$) alkyl group, $C_{1-6}$ alkoxy, halogen acetamide sulfonyl, cyano, hydroxyl, trifluoromethyl, amine where the hydrogen atoms have been replaced by organo groups and nitro groups which do not interfere with the formation of the aldimine or react with the activated keto methylene group present in the polymer. The key is that the substituent have no other acetoacetate reactive group; the monoaldimine is the only reactive group.

The polymeric dispersion having keto methylene functionality and the monoaldimine then are blended to form the crosslinkable polymeric dispersion. The polymeric dispersions typically will contain about 10 to 60% polymer or solids, preferably 45 to 60% by weight. The polymeric dispersion and monoaldimine are blended in a ratio such that there is sufficient monoaldimine present to effect reaction and cure with the polymer containing activated keto methylene groups, e.g., acetoacetate groups contained in the dispersion. Generally, the stoichiometry is such that from about 0.1 to 10 moles activated keto methylene group containing two protons per mole of monoaldimine is employed. Preferably, the stoichiometry is from 0.25 to 1.5 moles activated methylene group per mole of monoaldimine. Aldimine levels slightly above stoichiometric are preferred to insure crosslinking. The second proton on the acetoacetate is relatively unreactive as is a hydrocarbyl group, e.g., an active methylene containing a methyl group and the stoichiometry is adjusted accordingly.

Without meaning to limit the scope of this invention, the crosslinking mechanism is proposed to be as follows:

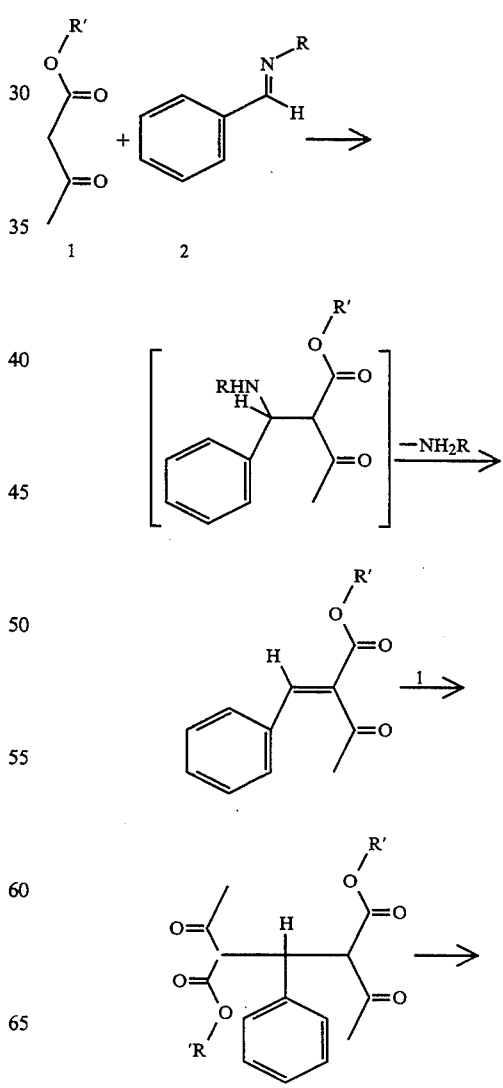

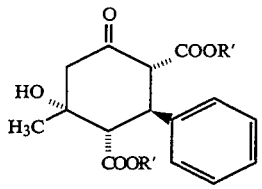

In the above described mechanism NH₂R represents the amine portion of the aldimine. If a polyaldimine were used to effect crosslinking, R could possibly include the amine and residual aldimine moiety. The most striking difference between aldimine crosslinking options proposed herein and the previous art is that this invention recognizes that a monoaldimine functionality is necessary to achieve crosslinking. Through this recognition one can reduce the level of crosslinking agent added to the polymeric dispersion for cure. To execute crosslinking, a mixture of the polymer, which can be either in solution or in emulsion form, and monoaldimine is cast and cured within a time period ranging from one day to three weeks, depending upon the composition of the polymers and structure of the aldimine.

The following examples are intended to represent various embodiments of the invention and are not intended to limit the scope. The examples are set forth in the following sequence: aromatic monoaldimine synthesis, polymer containing acetoacetate syntheses, and coating property evaluations of polymer crosslinked with aromatic aldimine. Another series involves heterocyclic monoaldimine synthesis, gel time to determine reaction rate, polymer synthesis and coating property evaluations of polymer crosslinked with heterocyclic aldimine.

The following examples are provided to illustrate various embodiments of the invention and are not intended to restrict the scope thereof.

AROMATIC MONOALDIMINE SYNTHESIS

EXAMPLE 1

Preparation of Benzylidene i-Propylamine

To a three neck round bottom flask, equipped with a cold water condenser, 30 g of water and 26.5 g of benzaldehyde were added. The mixture was mixed using a magnetic stirrer for 3 minutes at room temperature. i-Propylamine (17.7 g) was added to the reaction flask in one portion, followed by vigorous stirring for 40 minutes. The agitation was stopped and the reaction mixture was allowed to stand for at least 15 minutes. The lower aqueous layer was separated from the reaction mixture. The upper layer was collected and dried over magnesium sulfate to give 38.9 g of product. This crude product could be further purified by distillation, collecting the fraction between 94°–95° C./18 mmHg. $^1$H NMR (300 Hz, CDCl₃, ppm): 8.29 (1H, s), 7.70 (2H, m), 7.38 (3H, m), 3.53 (hep. J=6.3 Hz), 1.27 (9H, d, J=6.3 Hz); IR (NaCl film, cm$^{-1}$): 3061, 3026, 2930, 2835, 1647, 1581, 1450, 1382, 1306, 1141, 967, 755, 693.

EXAMPLE 2

Preparation of Benzylidene Butylamine

To a stirred mixture of 20 g of water and 21.2 g of benzaldehyde, butylamine (14.6 g) was added under an nitrogen atmosphere. After being stirred for 45 minutes at room temperature, the agitation was stopped and the reaction mixture was allowed to stand for at least 15 minutes. The lower aqueous layer was then separated from the reaction mixture. The upper layer was collected and dried over anhydrous magnesium sulfate to give 22.0 g of product. $^1$H NMR (300 Hz, CDCl₃, ppm): 8.25 (1H, s), 7.69 (2H, m), 7.39 (3H, m), 3.60 (2H, t, J=7.0 Hz), 1.68 (2H, p, J=7.3 Hz), 1.39 (2H, hex. J=7.7 Hz), 0.94 (3H, t, J=7.3 Hz)).

EXAMPLE 3

Preparation of Benzylidene t-Butylamine

To a three neck round bottom flask, equipped with a cold water condenser, 30 g of water and 26.5 g of benzaldehyde were added. The mixture was mixed with a magnetic stirrer at room temperature for 3 minutes. t-Butyl amine (22.1 g) was added to the reaction flask in one portion, followed by vigorous stirring for 15 hours. The agitation was stopped and the reaction mixture was allowed to stand for at least 15 minutes. The lower aqueous layer was separated from the reaction mixture. The upper layer was collected and dried over magnesium sulfate to give 35.5 g of product. $^1$H NMR (300 Hz, CDCl₃, ppm): 8.29 (1H, s), 7.77 (2H, m), 7.40 (3H, m), 1.33 (9H, s).

EXAMPLE 4

Preparation Benzylidene of 3-Hydroxypropylamine

To a three neck round bottom flask, equipped with a cold water condenser, 50 g of water and 25 g of benzaldehyde was added. All reactants were mixed with a magnetic stirrer at room temperature for 3 minutes. 3-Amino-1-propanol (17.8 g) was added to the reaction flask in one portion, followed by vigorous stirring for 2.5 hours. The agitation was stopped and the reaction mixture was allowed to stand for at least 15 minutes. The lower aqueous layer was separated and discarded. The upper layer was collected and washed with saturated sodium chloride solution. The organic layer was collected and dried over magnesium sulfate to give 26.1 g of product. $^1$H NMR (300 Hz, CDCl₃, ppm): 8.24 (1H, s), 7.65 (2H, m), 7.40 (3H, m), 3.83 (2H, t, J=5.6 Hz), 3.77 (2H, t, J=6.1 Hz), 1.92 (2H, p, J=5.6 Hz).

EXAMPLE 5

Preparation of Benzylidene 2,2-Dimethoxyethylamine

To a three neck round bottom flask, equipped with a cold water condenser, 20 g of water and 21.2 g of benzaldehyde were added. The reactants were mixed using a magnetic stirrer at room temperature for 3 minutes. Aminoacetaldehyde dimethyl acetal (21 g) was added to the reaction flask in one portion, followed by vigorous stirring for 2.5 hours. The agitation was stopped and the reaction mixture was allowed to stand for at least 15 minutes. The lower aqueous layer was separated and discard. The upper layer was collected and washed with saturated sodium chloride solution. The organic layer was collected and dried over magnesium sulfate to give 20.4 g of product. $^1$H NMR (300 Hz, CDCl₃, ppm): 8.26 (1H, s), 7.65 (2H, m), 7.40 (3H, m), 4.66 (1H, t, J=5.3 Hz), 3.77 (2H, d,d, J=5.3 Hz, J=1.5 Hz), 3.39 (6H, s).

EXAMPLE 6

Preparation of Benzylidene 2-(2-Hydroxyethoxy)ethylamine.

A three neck round bottom flask, equipped with a gas inlet/outlet tube and a cold water condenser, was charged with 106 g (0.5 mol) of benzaldehyde, 200 ml of tetrahydrofuran and 105 g (0.5 mol) of 2(2-aminoethoxy)ethanol in that sequence. The room temperature reaction was allowed to proceed under a nitrogen atmosphere for 18 hours. The solvent was then removed using a rotary evaporator and the residual was distilled at a reduced pressure (120°–123 °C./1 mmHg) to give a colorless liquid 170.3 g (88%). $^1$H NMR (300 Hz, CDCl$_3$, ppm): 8.24 (1H, s), 7.68 (2H, m), 7.36 (3H, m), 3.75 (4H, m), 3.64 (2H, m), 3.57 (2H, m); IR (NaCl film, cm$^{-1}$): 3384, 2863, 1646, 1451, 1127, 1067, 756, 694.

POLYMER SYNTHESES

EXAMPLE 7

Preparation of Butyl acrylate/Methyl Methacrylate/2-Acetoacetoxyethyl Methacrylate Terpolymer A three neck round bottom flask was charged with 27.3 g of butyl acrylate, 5.8 g of methyl methacrylate, 11.9 g of 2-acetoacetoxyethyl methacrylate, 0.45 g of dodecanethiol and 45 g of propylene glycol methyl ether acetate. This mixture was heated to 80° C. with vigorous mechanical stirring, under a nitrogen atmosphere. 2,2'-Azobis(2-methylbutanenitrile), 0.23 g, was added in one portion to the reaction mixture and the reaction was stirred at that temperature for 22 hours. A clear solution of the terpolymer was obtained and used without further purification. The resulting polymer had 0.62 milliequivalents acetoacetate per gram of polymer.

EXAMPLE 8

Preparation of Butyl acrylate/Methyl Methacrylate 2-Acetoacetoxyethyl Methacrylate Terpolymer A three neck round bottom flask was charged with 15.3 g of butyl acrylate, 7.9 g of methyl methacrylate, 17.7 g of 2-acetoacetoxyethyl methacrylate, and 49.5 g of propylene glycol methyl ether acetate. This mixture was heated to 80° C. with vigorous mechanical stirring, under a nitrogen atmosphere. 2,2'-Azobis(2-methylbutanenitrile), 0.20 g, was added in one portion to the reaction mixture and the reaction was stirred at that temperature for 22 hours. A clear solution of the terpolymer was obtained and used without further purification. The resulting polymer had 0.91 milliequivalents acetoacetate per gram of polymer.

EXAMPLE 9

Preparation of Butyl Acrylate/Methyl Methacrylate/2-Acetoacetoxyethyl Methacrylate Terpolymer.

A three neck round bottom flask was charged with 8.4 g of butyl acrylate, 7.6 g of methyl methacrylate, 24.3 g of 2-acetoacetoxyethyl methacrylate, 1.3 g of dodecanethiol and 52 g of butyl acetate. This mixture was heated to 70° C. with vigorous mechanical stirring, under a nitrogen atmosphere. 2,2'-Azobis(2-methylbutanenitrile), 0.62 g, was added in one portion to the reaction mixture and the reaction was stirred at that temperature for 22 hours. A clear solution of the terpolymer was obtained and used without further purification. The resulting polymer had 1.23 milliequivalents acetoacetate per gram of polymer.

EXAMPLE 10

Preparation Of AAEM Containing Emulsion Polymer

Into a clean, dry reactor equipped with heating, cooling, stirring and a nitrogen blanket capability was charged 96 g of polyester polyol [poly(neopentyl adipate) MW ~2,000, followed by 87 g of methylene dicyclohexyl diisocyanate and 0.2 g of dibutyltin dilaurate. With agitation, the reaction mixture was brought to 94° C. and held for 0.5 hour. At this point, 25 g of N-methylpyrrolidone solvent was added followed by titration for % NCO (theoretical NCO equals 11.6%). When the NCO value was met, 14 g of dimethylolpropionic acid powder was added followed by 27 g of N-methylpyrrolidone and reaction maintained at 94° C. for 2.5 hours.

The mixture was cooled to 25° C. while adding 168 g of butyl methacrylate, then 30 g of acetoacetoxyethylmethacrylate followed by 0.9 g of hexanediol diacrylate. To the prepolymer-monomer solution at 25° C. was added 11 of triethylamine with agitation to dissolve.

A second reactor was charged with 502 of distilled water under a nitrogen blanket and held at 25° C. The water was agitated and the prepolymer-monomer solution was added at a rate of 6.7% of the prepolymer solution per minute to form an aqueous dispersion. Catalyst VAZO 64 (AIBN from Dupont), 0.9 g in 8.4 of N-methylpyrrolidone, was slowly charged and mixed for 5 minutes.

Ethylenediamine (10) was dissolved in 20 of water and added immediately after the initiator. The dispersion was heated to 60°–65° C., allowed to exotherm to 75° C. during the course of polymerization and maintained until the residual monomers were less than 1,000 ppm.

The resulting aqueous polymer dispersion had a solid content of 43%, a pH of about 8 and a viscosity of 50 cps (with #2 spindle at 30 rpm on LTV).

EXAMPLE 11

Preparation of Triacetoacetylated Pentaerythritol

A mixture of t-butyl acetoacetate (158 g) and pentaerythritol (45 g) was heated at 140° C. in the presence of Ti(Oi-Pr)$_4$ (0.5 mL). The generated t-butanol was collected during the reaction. After one hour, the reaction was complete and a pale yellow (Gardner 1) viscous liquid was obtained (~96%).

EXAMPLE 12

Preparation of Acetoacetylate Terminated Polyurethane

To a mixture of triacetoacetylated pentaerythritol of Example 10 (13.85 g) and a commercial isophoronedisocyanate—polyether NCO terminated polyurethane prepolymer having an equivalent weight of 500 and a functionality of 2.3 (20.0 g) in butyl acetate (22.6 g), was added T-12, a dibutyltin dilaurate catalyst (0.1 g). The mixture was heated to 80° C. and stirred at that temperature for 18 hours. By that time there were no NCO functional groups left in the reaction mixture (indicated by IR). This polymer was used for film casting without further purification.

COATINGS PROPERTY EVALUATION

In general the properties of coatings were determined by mixing terpolymer A (40% solid) and preselected aldimines at ambient temperature. Films (from this mixture) were cast on steel plates in such a way that the resulting dry films had a thickness of between 1.3~2.7 mils. Films were dried in a static air atmosphere at room temperature. Film solvent resistance properties were used as the criterion to determine the extent of crosslinking reaction in the system. The major solvent resistance properties tested were:

1.) Swell index, which is defined as $$\text{Swell index} = \frac{W_{wet}}{W_{cure}}$$

(1) where $W_{wet}$ is the weight of a free film soaked in solvent for >72 hours and $W_{cure}$ is the weight of the cured film before soaking.

(2). Soluble percentage, which is defined as $$\% \text{ Soluble} = \frac{W_{cure} - W_{baked}}{W_{cure}} \times 100\%$$

where $W_{baked}$ is the weight of a film baked at 100° C. in a vacuum oven for two hours.

Ethyl acetate was used as the solvent for swell index and percentage soluble tests and ethyl acetate, toluene and/or methylethyl ketone were used for double rub resistance test. A swell index of below 2 is considered excellent. A percent insoluble fraction of below 20 and preferably below 10 is considered good. Double rub resistance values of 100 or greater are considered good.

EXAMPLE 13

Films Prepared From AAEM Terpolymer and Benzylidene i-Propylamine

An unpigmented coating composition was prepared with the acetoacetate containing acrylate terpolymer of Example 7 (A, 5.90 g) and the benzaldehyde/i-propylamine aldimine of Example 1 (B, 0.50 g). The stoichiometry was 1 mole equivalent acetoacetate (2 protons) per equivalent monoaldimine. The solvent resistance properties of the films are listed in Table 1.

TABLE 1

| Film | Swell Index | % Soluble | Double Rub Resistance | |
|---|---|---|---|---|
| | | | (Ethyl acetate) | (Toluene) |
| A + B (3 week) | 1.0 | 10 | >200 | 179 |
| A (3 week) | dissolved | 100 | 41 | 34 |

These results show that the monoaldimine of Example 1 was effective as a crosslinker in that the double rub resistance of the coating formed from polymeric dispersion (A) and the monoaldimine (B) was much higher and the percent solubles lower than the non-crosslinked polymer (A) above.

EXAMPLE 14

Films Prepared From AAEM Terpolymer and Benzylidene Butylamine

An unpigmented coating composition was prepared with the acetoacetate containing terpolymer of Example 7 (A, 5.90 g) and the benzaldehyde/butylamine benzaldimine of Example 2 (B, 0.54 g). The stoichiometry was 1 equivalent acetoacetate (2 protons) per equivalent aldimine. The solvent resistance properties of the films are listed in Table 2.

TABLE 2

| Film | Swell Index | % Soluble | Double Rub Resistance | |
|---|---|---|---|---|
| | | | (Ethyl acetate) | (Toluene) |
| A + B (1 week) | 2.4 | 10 | — | — |
| A + B (3 week) | 1.0 | 9 | >200 | >200 |
| A (3 week) | dissolved | 100 | 41 | 34 |

The results show that the crosslinked polymer, A+B, had less solubles and was more resistant to the double rub test than noncrosslinked terpolymer A above.

EXAMPLE 15

Films Prepared From AAEM Terpolymer and Benzylidene i-Propylamine

An unpigmented coating composition was prepared with the acetoacetate containing terpolymer of Example 7 (A, 5.90 g) and the monobenzaldimine of Example 3 benzaldehyde (t-butylamine) (B, 0.54 g). The solvent resistance properties of the films are listed in Table 3.

TABLE 3

| Film | Swell Index | % Soluble | Double Rub Resistance | |
|---|---|---|---|---|
| | | | (Ethyl acetate) | (Toluene) |
| A + B (1 week) | 2.7 | 10 | — | — |
| A + B (3 week) | 1.0 | 11 | >200 | >166 |
| A (3 week) | dissolved | 100 | 41 | 34 |

As in the previous examples, the crosslinked polymer formed on cure with the monoaldimine was more resistant to solvent than the non-crosslinked terpolymer (A) above.

EXAMPLE 16

Films Prepared From AAEM Terpolymer and Benzylidene 3-Hydroxypropylamine

An unpigmented coating composition was prepared with the acetoacetate containing terpolymer of Example 7 (A, 5.90 g) and the monobenzaldimine (benzaldehyde/hydroxypropylamine) of Example 4 (B, 0.55 g, one equivalent aldimine/2 protons). The solvent resistance properties of the films are listed in Table 4.

TABLE 4

| Film | Swell Index | % Soluble | Double Rub Resistance | |
|---|---|---|---|---|
| | | | (Ethyl acetate) | (Toluene) |
| A + B (1 week) | 2.3 | 12 | — | — |
| A + B (3 week) | 1.0 | 11 | >200 | >200 |
| A (3 week) | dissolved | 100 | 41 | 34 |

The results show an acceptable cure was achieved within one week with better solvent resistance at the 3-week cure. Again, the non-crosslinked polymer had poor solvent resistance.

EXAMPLE 17

Films Prepared From AAEM Terpolymer and Benzylidene i-Propylamine

An unpigmented coating composition was prepared with the acetoacetate containing terpolymer of Example 8 (A, 7.00 g) and the monobenzaldimine of Example 1 (B, 1.00 g). The stoichiometry was 1 mole acetoacetate (2 protons) per 1 mole aldimine. The solvent resistance properties of the films are listed in Table 5.

TABLE 5

| Film | 1 day cure | | 7 days cure | | Double rub resistance (Ethyl acetate/Toluene) |
|------|------------|--|-------------|--|---|
|      | Swell index | % Soluble | Swell index | % Soluble | |
| A + B | 2.8 | 11 | 2.1 | 12 | >200/>200 |
| A | dissolved | dissolved | dissolved | dissolved | 21/61 |

The results show the monobenzaldimine effected cure of the polymer rather quickly.

EXAMPLE 18

Films Prepared From AAEM Terpolymer and Benzylidene 2-(2-Hydroxyethoxyl)ethylamine An unpigmented coating composition was prepared with the acetoacetate containing terpolymer of Example 8 (A, 4.00 g) and the benzaldehyde/2-(2-hydroxyethyl)ethylamine aldimine of Example 6 ($B_1$, 0.35 g or $B_2$, 0.70 g). Films were allowed to stand at ambient temperature for 5 days. The solvent resistance properties of the films are listed in Table 6.

TABLE 6

| Film | Swell Index | % Soluble | Double Rub Resistance | |
|------|-------------|-----------|-----------------------|--|
|      |             |           | (Ethyl acetate) | (Toluene) |
| A + $B_1$ | 1.5 | 7 | >200 | >200 |
| A + $B_2$ | 1.7 | 16 | >200 | >200 |
| A | dissolved | 100 | 21 | 61 |

The hydroxyethyl aldimine of Example 6 was effective in producing resulted in crosslinked systems. Double rub resistance was excellent. Films cast with the theoretical stoichiometry exhibited substantially lower percent solubles and slightly lower swell index.

EXAMPLE 19

Films Prepared From AAEM Containing Emulsion Polymer

An unpigmented coating composition was prepared with the AAEM containing urethane/acrylate emulsion polymer of Example 10 (4.0) and the benzylidene i-propylamine of Example 1 (0.082 g). After mixing the two components and allowing the system to settle down for about 5-10 minutes, a very good dispersion system was obtained. Films cast with this emulsion were allowed to stand at ambient temperature for 2 days. The solvent resistance properties of the films are listed in Table 7.

TABLE 7

| [AAEM]/[Aldimine] | EtOH Rub | MEK Rub |
|-------------------|----------|---------|
| 2:1 | 54 | >200 |
| 1:1 | 45 | >200 |
| 1:0 | 34 | 69 |

The film performance showed that with the addition of aldimine, the methylethylketone resistance property of the films was significantly improved, although the resistance to ethanol only marginally improved, compared to the film which was not cured with the aldimine.

To summarize, the results of Examples 13-19 show all of the monoaldimines were effective in crosslinking the polymer containing acetoacetate groups. Little difference between the various amines used to form the benzaldimine was noticed in performance.

HETEROCYCLIC MONOALDIMINE SYNTHESES

EXAMPLE 20

Preparation of N-i-propylfurfurylidene

To a three neck round bottom flask equipped with a cold water condenser were added 38.4 g of furfural, 50 g of toluene and 28.0 g of i-propylamine, in that order. The mixture was mixed with vigorous stirring for 12 hours. The agitation was stopped and the reaction mixture was allowed to stand for at least 15 minutes. The lower aqueous layer was separated from the reaction mixture. The upper layer was collected, washed with brine and dried over magnesium sulfate. After the drying agent was removed from the mixture, the toluene was removed on a rotary evaporator. The residual was distilled under reduced pressure. The fraction at 81°-82° C./26 mmHg was collected to give 59.2 g of colorless product.

EXAMPLE 21

Preparation of 2-Thiophenylidene i-Propylamine

The same procedure as that of Example 16 was employed. 2-Thiophenecarboxaldehyde, 22.4 g, and 13 g of i-propylamine in 20 ml of toluene gave the desired product (30.4 g, almost quantitative).

EXAMPLE 22

Preparation of 3-Thiophenylidene i-Propylamine

The same procedure as that of Example 16 was employed. 3-thiophenecarboxaldehyde, 10.0 g, and 5.5 g of i-propylamine in 10 ml of toluene gave 14.5 g of the desired product.

EXAMPLE 23

Preparation of N-Methyl-2-Pyrrolidene i-Propylamine

To a three neck round bottom flask, equipped with a cold water condenser were added 21.8 g of 1-methyl-2-pyrrolecarboxaldehyde, 13 g of i-propylamine and 20 ml of toluene. The reaction mixture was stirred at 70° C. for three hours to give a cloudy solution. The agitation was stopped and the reaction mixture was allowed to stand for at least 15 minutes. The upper layer was collected and washed with saturated sodium chloride solution. The organic layer was collected and dried over magnesium sulfate. Solvent was removed using a rotary evaporator to give 29.3 g of crude product containing 84% of the desired aldimine and 16% of the starting material (aldehyde).

EXAMPLE 24

Preparation of 2-Pyrrolidene i-Propylamine

The same procedure as that of Example 16 was employed. 2-pyrrolecarboxaldehyde, 2.85 g, and 1.82 g of i-propylamine in 10 ml of toluene gave 3.90 g of the desired product.

EXAMPLE 25

Preparation of 2-Pyridylidene i-Propylamine

The same procedure as that of Example 16 was employed. 2-pyridinecarboxaldehyde, 3.21 g, and 1.82 g of i-propylamine in 10 ml of toluene gave 4.50 g of the desired product.

EXAMPLE 26

Preparation of 3-Pyridinylidene i-Propylamine

The same procedure as that of Example 16 was employed. 3-pyridinecarboxaldehyde, 3.21 g, and 1.82 g of i-propylamine in 10 ml of toluene gave 4.60 g of the desired product.

COATINGS EVALUATION

EXAMPLE 27

Reaction Rate Measurement Between Aldimine and Acetoacetate Group

Reaction rate measurements for benzaldimine and several heterocyclic aldimines with acetoacetate functionality were obtained using model systems. This was accomplished by adding the respective aldimine to t-butyl acetoacetate in a ratio of 1 mole acetoacetate to 1 mole aldimine in tetrahydrofuran at 25° C. The concentration of the reactants was measured by GC and the reaction rate determined therefrom. The results are shown in Table 7.

TABLE 7

| Aldimine | Rate Constant (relative) |
| --- | --- |
| 5-Nitrothiophene-2-carboxaldimine | 1 |
| Benzaldimine | 3 |
| Thiophene-2-carboxaldimine | 11 |
| 3-Pyridinecarboxaldimine | 16 |
| Thiophene-3-carboxaldimine | 29 |
| N-Methylpyrrole-2-carboxaldimine | 38 |
| 2-Pyridinecarboxaldimine | 73 |
| 2-Furfuraldimine | 134 |
| Pyrrole-2-carboxaldimine | 194 |

Measurement of the reaction rates of furfuraldimine with t-butyl acetoacetate at different temperatures to obtain an Arrhenius relationship leads to the prediction that at 47° C., benzaldimine will react with acetoacetate functionality at the same rate as that of furfuraldimine at 25° C.

EXAMPLE 28

Gel Time

To further confirm the fast reaction of acetoacetate with heterocyclic aldimines vis-a-vis benzaldimine, gel time measurements were made. This was accomplished by mixing an acetoacetate functional polymer, namely, (2-acetoacetoxyethyl methacrylate/methyl methacrylate/butylacrylate (50:24:26) with one equivalent of the benzaldimine (benzylidene-i-propylamine); gelation occurs after about two hours. When the same polymer was mixed with furfuraldimine, gelation occurred in only about ten minutes.

EXAMPLE 29

Comparison with Polyaldimine Crosslinker

A comparison of the monaldimine of Example 16 and conventional polyaldimines crosslinkers in an acrylic polymer containing 40% of acetoacetoxyethyl methacrylate by weight was made. The aldimines tested were monobenzaldimine (BENAL), and two dialdimines, benzaldehyde/ethylenediamine (EDAL) and hexamethylenedialdimine (HMDAL). Table 8 sets forth the results.

TABLE 8

|  | No crosslinker | BENAL | EDAL | HMDAL |
| --- | --- | --- | --- | --- |
| MEK Rubs | 5 | 90 | 30 | 60 |

The results show that the monobenzaldimine was highly effective in achieving a crosslinked polymer as evidenced by the higher number of solvent rubs with methylethyl ketone (MEK) when compared to the results for the two dialdimines.

EXAMPLE 30

Performance Characteristics of Heterocyclic Aldimines

The purpose of this example is to provide a comparison in the performance between the fast reacting heterocyclic aldimines in their cure of an AAEM polyacrylate polymer. An unpigmented coating composition was prepared from the acetoacetate containing terpolymer of Example 8 and several of the heterocyclic aldimines evaluated in Example 27. The same polymer without crosslinker is listed to provide a comparative basis with a noncrosslinked polymer. The results are shown in Table 9.

TABLE 9

| Film | Gloss 20°/60°/85° | Pendulum Hardness | Solvent Rub (ETOH) | Solvent Rub (MEK) | Swell Index (EA) | % Soluble (EA) | Rate Const. |
| --- | --- | --- | --- | --- | --- | --- | --- |
| A | 105/119/99 | 71 | 50 | 10 | — | — | 38 |
| B | 110/129/99 | 131 | >200 | >200 | 1.1 | 14 | 29 |
| C | 114/134/99 | 84 | >200 | 50 | — | — | 194 |
| D | 107/123/99 | 155 | >200 | >200 | 1.1 | 16 | 73 |
| E | 106/123/99 | 141 | >200 | >200 | 1.1 | 17 | 16 |
| F | 117/134/98 | 93 | >200 | 60 | 1.6 | 17 | 134 |
| G | 103/125/98 | 16 | 15 | 13 | dissolved | 100 | — |

A: 60% AAEM containing polyacrylate:N-methylpyrrole 2 carboxaldimine (mole ratio 100/75)
B: 60% AAEM containing polyacrylate:3-thiophene carboxaldimine (100/75)
C: 60% AAEM containing polyacrylate:pyrrole-2-carboxaldimine (100/75)
D: 60% AAEM containing polyacrylate:pyridine-2-carboxaldimine (100/75)
E.: 60% AAEM containing polyacrylate:pyridine-3-carboxaldimine (100/75)
F: 60% AAEM containing polyacrylate:furfuraldimine (100/75)
G: 60% AAEM containing polyacrylate only

25° C.

From the above table it can be seen that hard, glossy coatings can be obtained with the AAEM containing polyacrylate and monoaldimine crosslinking agents.

Solvent resistance of the coatings is significantly improved compared to film G which does not contain monoaldimine, with some exhibiting excellent resistance to both ethanol and methylethyl ketone. At this point it is not fully understood why some of the cross-linked systems did not cure to a fuller extent. For example, film A showed that cure was partial, at best. Such result is not fully understood and it is possible that it is not representative.

EXAMPLE 31

Films Prepared From Acetoacetylated Urethane Oligomers

An unpigmented coating composition was prepared from the acetoacetylate terminated polyurethane of Example 12 (4.16 g) and the 3-pyridinecarboxaldimine of Example 26 (0.47 g). Film properties were tested after one week. The solvent resistance and the Pendulum hardness of the film are listed in Table 10.

TABLE 10

| Gloss (20°/60°/85°) | Hardness | MEK Rub | EtOH Rub | Toluene Rub |
| --- | --- | --- | --- | --- |
| 105/122/98 | 68 | −90 | −100 | −70 |

What is claimed is:

1. In a polymeric dispersion comprising a dispersion containing a polymer having a plurality of activated keto methylene groups and an effective amount of aldimine containing curing agent to effect crosslinking and cure of said polymer, the improvement which comprises an aromatic or heterocyclic monoaldimine as said curing agent, said monoaldimine having no other group reactive with the activated keto methylene group.

2. The polymeric dispersion of claim 1 wherein the activated keto methylene group in the polymer contained in said dispersion is represented by the structures:

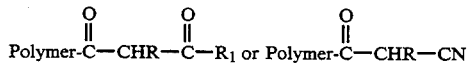

wherein R is hydrogen or methyl and $R_1$ is $C_{1-4}$ alkyl.

3. The polymeric dispersion or solution of claim 1 wherein said monoaldimine functionality is represented by the structures:

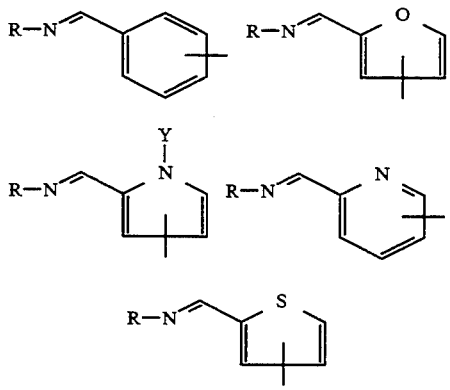

wherein, R is $C_{1-10}$ aliphatic, $C_{1-10}$ alkylene oxide, awl or a substituted derivative and the open bond represents hydrogen or a substituent such as a $C_{1-6}$ alkyl group, $C_{1-6}$ alkoxy, halogen, acetamide, sulfonyl, cyano hydroxyl, trifluoromethyl, amino where the hydrogen atoms have been replaced by organo groups and nitro group.

4. The polymeric dispersion of claim 3 wherein at least a portion of said polymer has polymerized ethylenically unsaturated monomer units, said monomer units represented by the structure:

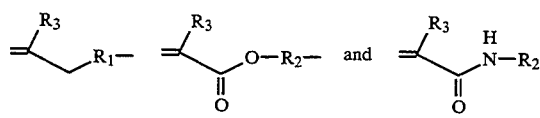

wherein $R_1$ is $C_{1-20}$ alkyl, $C_{1-20}$ alkoxy, and hydroxyalkyl where the alkyl group has from 1–20 carbon atoms; $R_2$ is $C_{1-20}$ alkyl, $C_{1-20}$ alkoxy, and hydroxyalkyl where the alkyl group has from 1–20 carbon atoms; and $R_3$ is hydrogen or methyl.

5. The polymeric dispersion or solution of claim 4 wherein the polymer containing the activated keto methylene functionality is represented by the formula:

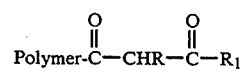

wherein R is hydrogen or methyl and $R_1$ is $C_{1-4}$ alkyl.

6. The polymeric dispersion or solution of claim 5 wherein the monoaldimine is represented by the formulas selected from the group consisting of:

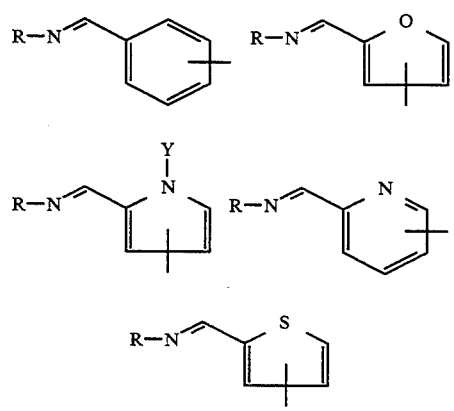

wherein R is $C_{1-4}$ and the open bond represents hydrogen or a substituent such as a $C_{1-6}$ alkyl group, or $C_{1-6}$ alkoxy group.

7. The polymeric dispersion of claim 5 wherein R of the acetoacetate group is hydrogen.

8. The polymeric dispersion of claim 7 wherein the weight percent of acetoacetate functionality is from 10 to 80 percent by weight based on the total weight of the polymer.

9. The polymeric dispersion of claim 8 wherein the mole ratio of acetoacetate to monoaldimine in said polymeric dispersion is from about 0.25 to 1.5.

10. The polymeric dispersion of claim 9 wherein at least a portion of the polymeric component of the dispersion is an acrylate polymer having the structure

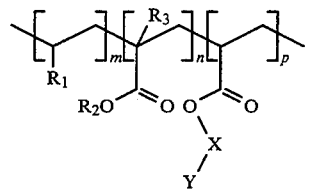

where $R_1$ is derived from an ethylenically unsaturated compound capable of copolymerization with another ethylenically unsaturated monomer, $R_2$ is $C_1$-$C_{20}$ alkyl, alkylene oxide, aryl, $R_3$ is hydrogen or methyl, $X = C_1$-$C_{20}$ alkyl, alkylene oxide, aryl, secondary or tertiary alkylene amine, Y is a unit having the structure:

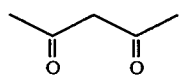

m is 0–100, n is 1–100 and p is 1–10.

11. The polymeric dispersion of claim 10 wherein the monoaldimine is a monobenzaldimine.

12. The polymeric dispersion of claim 11 wherein the molecular weight of the polymer containing acetoacetate functionality is from about 2,000 to 15,000.

13. The polymeric dispersion of claim 12 wherein the acetoacetate containing monomer is acetoacetoxyethyl methacrylate.

14. The polymeric dispersion of claim 12 wherein the acetoacetate containing monomer is N-acetoacetylacrylamide.

15. The polymeric dispersion of claim 13 wherein the acetoacetate containing monomer is present in an amount of from 20–60 percent by weight of the total polymer.

16. The polymeric dispersion of claim 15 wherein the alkyl functionality $R_1$ and $R_2$ is from 1–6 carbon atoms.

17. In a dispersion containing a polyurethane/acrylate hybrid having acetoacetate functionality and an aldimine crosslinker, the improvement which comprises a blend of:
 a) a polyurethane/acrylate hybrid having 2.5–50% acetoacetate functionality by weight; and,
 b) an aromatic or heterocyclic monoaldimine as the crosslinker.

18. The polyurethane/acrylate dispersion of claim 17 wherein the polyurethane is formed from an isocyanate selected from the group consisting of toluenediisocyanate, isophoronediisocyanate, methylene di(phenylisocyanate), or methylene di(cyclohexylisocyanate)acrylate.

19. The polyurethane/acrylate dispersion of claim 18 wherein the polyurethane is formed from a long chain polyol having a molecular weight of from about 200 to 3000.

20. The polyurethane/acrylate dispersion of claim 19 wherein the polymer containing acetoacetate functionality contains polymerized units of acetoacetoxyethyl methacrylate.

21. The water-based polyurethane/acrylate hybrid of claim 20 wherein the monoaldimine is selected from the group consisting of those represented by the structures:

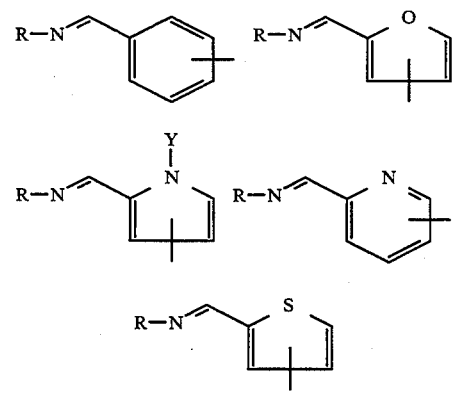

wherein, R is $C_{1-10}$ aliphatic, $C_{1-10}$ alkylene oxide, aryl or a substituted derivative and the open bond represents hydrogen or a substituent such as a $C_{1-6}$ alkyl group, $C_{1-6}$ alkoxy, halogen, acetamide, sulfonyl, cyano hydroxyl, trifluoromethyl, amino where the hydrogen atoms have been replaced by organo groups and nitro group.

22. The polyurethane/acrylate dispersion of claim 21 wherein the polymer containing acetoacetate functionality containing polymerized units of acetoacetoxyethyl methacrylate is a copolymer comprising polymerized units of an acrylic monomer comprising methacrylate, butyl acrylate, or ethylhexyl acrylate.

* * * * *